US011873973B2

(12) United States Patent
Yan et al.

(10) Patent No.: US 11,873,973 B2
(45) Date of Patent: Jan. 16, 2024

(54) LAMP MOUNTING STRUCTURE AND LAMP COMPRISING THE SAME

(71) Applicant: SAVANT TECHNOLOGIES LLC, East Cleveland, OH (US)

(72) Inventors: Xinping Yan, Shanghai (CN); Weikang Dai, Shanghai (CN); Huisheng Zhou, Shanghai (CN)

(73) Assignee: SAVANT TECHNOLOGIES LLC, East Cleveland, OH (US)

( * ) Notice: Subject to any disclaimer, the term of this patent is extended or adjusted under 35 U.S.C. 154(b) by 0 days.

(21) Appl. No.: 17/721,545

(22) Filed: Apr. 15, 2022

(65) Prior Publication Data

US 2022/0333748 A1 Oct. 20, 2022

(30) Foreign Application Priority Data

Apr. 15, 2021 (CN) ......................... 202120768314.1

(51) Int. Cl.
*F21S 8/04* (2006.01)
*F21S 2/00* (2016.01)
*F21V 17/12* (2006.01)
*F21V 21/03* (2006.01)

(52) U.S. Cl.
CPC ............... *F21S 8/043* (2013.01); *F21S 2/005* (2013.01); *F21V 17/12* (2013.01); *F21V 21/03* (2013.01)

(58) Field of Classification Search
CPC .... F21S 8/026; F21S 8/02; F21S 8/024; F21S 8/03; F21S 8/033; F21S 8/043; F21S 2/00; F21V 21/04; F21V 21/048; F21V 17/12; F21V 21/03
See application file for complete search history.

(56) References Cited

U.S. PATENT DOCUMENTS

| | | | | |
|---|---|---|---|---|
| 6,962,498 | B2 | 11/2005 | Kohen | |
| 9,797,562 | B2 * | 10/2017 | Dabiet | F21S 8/02 |
| 10,677,403 | B1 | 6/2020 | Li et al. | |
| 2017/0009966 | A1 | 1/2017 | Zhang | |
| 2019/0017688 | A1 * | 1/2019 | Morales | H05B 45/00 |
| 2020/0116336 | A1 | 4/2020 | Budavari et al. | |

FOREIGN PATENT DOCUMENTS

| | | | |
|---|---|---|---|
| CA | 2422087 | A1 | 12/2002 |
| CA | 2663852 | A1 | 10/2010 |
| CA | 3069223 | A1 | 1/2019 |
| CN | 106704925 | A | 5/2017 |
| CN | 107906408 | A | 4/2018 |

OTHER PUBLICATIONS

Canadian Office Action for Canadian Application No. 3,153,404 dated Aug. 18, 2023, 6 pages.

* cited by examiner

*Primary Examiner* — William J Carter
(74) *Attorney, Agent, or Firm* — WOOD IP LLC

(57) ABSTRACT

The application relates to a lamp mounting structure and a lamp comprising the same. The lamp mounting structure includes: a mounting section, fixable to a fixed surface on which a power input line is provided; an engagement section, configured to be detachably connected with a lamp body of a lamp; and a wiring section, configured to realize electrical connection between the power input line and the lamp. The technical solution of the application achieves the technical effect that enabling a user to easily connect a ceiling lamp mechanically and electrically without any help.

24 Claims, 9 Drawing Sheets

LAMP MOUNTING STRUCTURE AND LAMP COMPRISING THE SAME

TECHNICAL FIELD

The application relates to the field of lighting lamps. Specifically, the application relates to a lamp mounting structure and a lamp comprising the same.

BACKGROUND

At present, it is troublesome and inconvenient to mount a ceiling lamp. As shown in FIG. 1*a* to FIG. 1*f*, the mounting of an existing ceiling lamp comprises the following steps: 1) opening a lampshade of a ceiling lamp to expose a lamp body with a mounting surface; 2) removing screws from the lamp body with a screwdriver; 3) screwing wires (including a fire wire, a zero wire, a ground wire, etc.) of the lamp body and reserved wires on the ceiling (or a junction box) together by a wiring cap; 4) aligning the lamp body with the ceiling (or the junction box on the ceiling) and inserting the screws therein; 5) tightening the screws by the screwdriver to fix the lamp body to the ceiling (or the junction box); and 6) mounting the lampshade onto the lamp body, so as to complete the mounting of the ceiling lamp.

However, the above process is not user-friendly. One reason is that in step 3), when connecting the wires of the lamp body with the wires on the ceiling, the user needs to hold the lamp body with one hand and use the wiring cap to screw the wires together with the other hand. Generally, because the wires include the fire wire, the zero wire and the ground wire, the user usually needs to repeat the operation of twisting wires three times, which makes the operation very troublesome. Especially when the lamp body is heavy, the user needs to operate for a long time with holding the lamp body by a single hand, which poses a challenge to the user's operation. Another reason is that in step 2) and step 5), the user has to use additional tools like a screwdriver for mounting, which causes inconvenience to the user. Yet another reason is that the user has to disassemble the lampshade for mounting, so it is easy for the user's fingers to touch an LED or other electrical parts in the lamp body during mounting, which results in the failure and other quality risks of the parts in the lamp body.

Therefore, in view of the above, a tool-free, fast and simple lamp mounting process is expected.

SUMMARY

Embodiments of the application provide a lamp mounting structure for easy mounting of a ceiling lamp and a lamp comprising the same, to at least solve the problem in the prior art that tool-free, fast and simple mounting of the ceiling lamp cannot be achieved.

According to an aspect of the embodiments of the application, a lamp mounting structure is provided, which includes: a mounting section, fixable to a fixed surface on which a power input line is provided; an engagement section, configured to be detachably connected with a lamp body of a lamp; and a wiring section, configured to realize electrical connection between the power input line and the lamp.

In this way, by realizing the electrical connection between the power input line and the lamp using the wiring section, realizing the mechanical connection between the lamp mounting structure and the lamp body using the engagement section, and realizing the mechanical connection between the lamp mounting structure and the fixed surface using the mounting section, the mechanical connection between the lamp body and the fixed surface and the electrical connection between the lamp body and the mains supply can be realized. In addition, using the lamp mounting structure enables the user to easily mount the lamp body onto the desired fixed surface without tedious operations, thereby improving the mounting operation of the user.

In a schematic embodiment of the lamp mounting structure, the wiring section is built in or attached to the mounting section.

In this way, the position of the wiring section may be arbitrarily set as needed, as long as the position is suitable for inserting the power input line and a power line of the lamp body therein to form the electrical connection.

In a schematic embodiment of the lamp mounting structure, the wiring section includes an input section and an output section, and the electrical connection is formed by connecting the power input line to the input section and connecting a power line of the lamp to the output section.

In this way, the electrical connection between the power input line and the lamp can be realized in a simple way, thus avoiding the troublesome operation of twisting wires in the traditional lamp mounting process.

In a schematic embodiment of the lamp mounting structure, the input section and the output section are positioned on a side surface of the mounting section.

In this way, by exposing the input section and the output section from the side surface of the mounting section, the user can easily insert the power input line and the power line of the lamp body into the wiring section to form connection, thus simplifying the wiring operation.

In a schematic embodiment of the lamp mounting structure, the mounting section has a hollow structure, and the side surface comprises an inner surface and an outer surface, the input section is on the inner surface or the outer surface, and the output section is on the inner surface or the outer surface.

In this way, the input section and the output section may be arranged on the opposite side surfaces or the same side surface of the mounting section as needed, thus providing flexibility for the electrical connection of the lamp, making it suitable for a variety of use scenarios.

In a schematic embodiment of the lamp mounting structure, the wiring section comprises a connecting terminal comprising a couple of input sections and a couple of output sections.

In this way, the electrical connection between a couple of wires of the power input line and a couple of wires of the lamp body may be easily realized. For example, when the connecting terminal comprises three input sections and three output sections, the electrical connection between the fire wire, the ground wire and the zero wire of the power input line and the fire wire, the ground wire and the zero wire of the power line of the lamp body may be easily realized.

In a schematic embodiment of the lamp mounting structure, the wiring section is a crystal terminal.

In this way, the electrical connection between the power input line and the power line of the lamp may be easily realized by means of the crystal terminal.

In a schematic embodiment of the lamp mounting structure, the mounting section includes: a mounting bracket, configured to fix the lamp mounting structure to the fixed surface; and a mounting body, which is below and connected to the mounting bracket. The engagement section is arranged below the mounting body.

In this way, the mechanical connection between the lamp mounting structure and the fixed surface may be realized through the mounting bracket, and the mechanical connection between the lamp mounting structure and the lamp body may be realized through the engagement section. Thus, the tool-free and simple mounting of the lamp including the mounting structure to the fixed surface can be realized. In addition, the engagement section is below the mounting body, which makes the lamp mounting structure can be easily engaged with the lamp body.

In a schematic embodiment of the lamp mounting structure, the mounting section comprises: a mounting bracket, configured to fix the lamp mounting structure to the fixed surface; and a mounting body, which is below and connected to the mounting bracket. The engagement section is arranged on the mounting body.

In this way, the tool-free and simple mounting of the lamp to the fixed surface can be realized. In addition, the engagement section is arranged on the mounting body, so that the mounting body and the engagement section can be formed integrally, which makes the structure of the lamp more simple and easy to operate.

In a schematic embodiment of the lamp mounting structure, in the horizontal plane, the cross-sectional area of the mounting bracket is larger than that of the mounting body, and/or the cross-sectional area of the mounting body is smaller than that of the engagement section.

In this way, by making the cross-sectional area of the mounting bracket larger than the cross-sectional area of the mounting body, the mounting bracket may be easily fixed to the fixed surface. By making the cross-sectional area of the mounting body smaller than the cross-sectional area of the engagement section, the engagement section and the lamp body may be easily engaged together.

In a schematic embodiment of the lamp mounting structure, the engagement section comprises a convex portion, and the lamp body is fixed to the lamp mounting structure by engaging with the convex portion.

In this way, the engagement section comprises the convex portion, so that the lamp mounting structure may be engaged with the corresponding engaging groove on the lamp body by means of the convex portion, so as to realize the mechanical connection.

In a schematic embodiment of the lamp mounting structure, the convex portion is U-shaped, arc-shaped or rod-shaped.

In this way, when the convex portion is U-shaped, the U-shaped convex portion may slide into the corresponding U-shaped engaging groove on the lamp body; when the convex portion is arc-shaped, the arc-shaped convex portion may be screwed into the corresponding arc-shaped engaging groove on the lamp body; and when the convex portion is rod-shaped, the rod-shaped convex portion may be pressed into or embedded into the corresponding rod-shaped engaging groove on the lamp body. Thus, the mechanical connection between the lamp mounting structure and the lamp body may be realized easily.

In a schematic embodiment of the lamp mounting structure, the engagement section comprises threads arranged on the side surface of the mounting body or an engaging groove arranged on the side surface or a lower surface of the mounting body. The lamp body may be fixed to the lamp mounting structure by being rotated with the threads or engaging with the engaging groove.

In this way, the engagement section includes the engaging groove, so that the lamp mounting structure may be engaged with the corresponding convex portion on the lamp body by means of the engaging groove, so as to realize the mechanical connection between the lamp mounting structure and the lamp body. Alternately, the engagement section includes the threads and the corresponding threads are arranged on the lamp body, so that the lamp body of the lamp may be rotationally fastened to the lamp mounting structure by means of the threads. By means of the threads or the engaging groove, there is no need to use the screwdriver or other additional tools for fastening, which facilitates the user's mounting operation. In addition, when the threads or the engaging groove is arranged on the side surface of the mounting body, there can be no gap, or very small gap, between the lamp body and the mounting bracket after fastening the lamp body and the mounting body, so that the ceiling lamp can be attached to the ceiling with a very small gap, thereby achieving a beautiful ceiling effect.

In a schematic embodiment of the lamp mounting structure, the engaging groove is U-shaped, arc-shaped or rod-shaped.

In this way, when the engaging groove is U-shaped, engagement can be realized by sliding the corresponding U-shaped convex portion on the lamp body into the U-shaped engaging groove on the lamp mounting structure; when the engaging groove is arc-shaped, engagement can be realized by screwing the corresponding arc-shaped convex portion on the lamp body into the arc-shaped engaging groove on the lamp mounting structure; and when the engaging groove is rod-shaped, engagement can be realized by pressing or embedding the corresponding rod-shaped convex portion on the lamp body into the rod-shaped engaging groove on the lamp mounting structure. Thus, the mechanical connection between the lamp mounting structure and the lamp body may be realized easily.

In a schematic embodiment of the lamp mounting structure, the mounting bracket is provided with screw holes, and the mounting bracket is fixed to the fixed surface by means of thumb screws.

In this way, the mounting bracket may be fixed to the fixed surface, for example, the ceiling, only through the user's manual operation without additional tools. Thus, the user's mounting operation is simplified.

In a schematic embodiment of the lamp mounting structure, the fixed surface is the lower surface of a wall, a ceiling, or a junction box on the ceiling.

In this way, the lamp mounting structure or the lamp comprising the same may be mounted onto the wall, the ceiling, or the junction box on the ceiling as needed, so as to make the lamp mounting structure suitable for different use scenarios.

According to another aspect of the embodiments of the application, a lamp is also provided, which includes: the above lamp mounting structure; and a lamp body, a upper surface of which is provided with an engagement section matching with the engagement section of the lamp mounting structure.

In this way, the lamp may be electrically connected with the fixed surface through the wiring section on the lamp mounting structure without the tedious operation of twisting and connecting wires, and the lamp mounting structure may be mechanically connected with the lamp body through the engagement sections on the mounting body and the lamp body without the tedious operation of fastening screw, thereby optimizing the user's lamp mounting process.

In a schematic embodiment of the lamp, a power line of the lamp body is exposed from the upper surface, and the power line is electrically connected with the power input line by being inserted into the wiring section of the lamp mounting structure.

In this way, the electrical connection can be easily formed by inserting the power line of the lamp body into the wiring section of the lamp mounting structure, and the power line exposing from the upper surface facilitates the no-gap mechanical connection between the lamp body and the lamp mounting structure.

In a schematic embodiment of the lamp, when the engagement section of the lamp mounting structure comprises a convex portion, the engagement section of the lamp body comprises an engaging groove matching with the shape of the convex portion to engage with the convex portion; or when the engagement section of the lamp mounting structure comprises an engaging groove, the engagement section of the lamp body comprises a convex portion matching with the shape of the engaging groove to engage with the engaging groove.

In this way, by arranging on the lamp body the engaging groove matching with the convex portion of the lamp mounting structure, or arranging the convex portion matching with the engaging groove of the lamp mounting structure, the mechanical connection between the lamp mounting structure and the lamp body may be realized by the engagement (i.e. snap-fitting) between the engaging groove and the convex portion. The mechanical connection process is simple and easy to operate, without the use of additional tools. In addition, by using the snap-fitting, the gap between the lamp body and the lamp mounting structure can be very small after engaging the engagement sections of the lamp body and the lamp mounting structure together, so that the ceiling lamp can be attached to the ceiling with a very small gap, thereby achieving a beautiful ceiling effect.

In a schematic embodiment of the lamp, when the engagement section of the lamp mounting structure comprises the threads arranged on the side surface of the lamp mounting structure, the engagement section of the lamp body comprises threads matching with the threads of the lamp mounting structure, and the threads of the engagement section are on a side surface concaved downward from the upper surface of the lamp body.

In this way, by arranging threads matching with the threads of the lamp mounting structure on the lamp body, the lamp body can be fastened onto the lamp mounting structure by rotation, thereby facilitating the user's mount operation. In addition, fastening through the threads makes it easy to realize the no-gap connection between the lamp body and the lamp mounting structure, which facilitates achieving an excellent ceiling effect.

According to another aspect of the embodiments of the application, a method of mounting a lamp is also provided, wherein the lamp comprises a lamp mounting structure and a lamp body, the lamp body is provided with a power line, the method comprising: fixing the lamp mounting structure to a fixed surface, the fixed surface being provided with a power input line; connecting the power input line and the power line to the lamp mounting structure; and engaging the lamp mounting structure with the lamp body.

In this way, the mechanical connection between the lamp body and the fixed surface and the electrical connection between the lamp body and the mains supply can be realized with simple operations, so that the lamp can be mounted to the desired fixed surface with simple operations.

In a schematic embodiment of the method of mounting the lamp, the lamp mounting structure comprises a mounting section, an engagement section and a wiring section, the lamp body comprises an engagement section. Fixing the lamp mounting structure to the fixed surface comprises fixing the mounting section of the lamp mounting structure to the fixed surface; connecting the power input line and the power line to the lamp mounting structure comprises connecting the power input line and the power line to the wiring section of the lamp mounting structure; and engaging the lamp mounting structure with the lamp body comprises engaging the engagement section of the lamp mounting structure with the engagement section of the lamp body.

In this way, the electrical connection between the power input line and the lamp body is realized using the wiring section, the mechanical connection between the lamp mounting structure and the lamp body is realized using the engaging portion, and the mechanical connection between the lamp mounting structure and the fixed surface is realized using the mounting section, thereby the mechanical connection between the lamp body and the fixed surface and the electrical connection between the lamp body and the mains supply can be realized. Furthermore, with the above steps, the user can conveniently mount the lamp body to the desired fixed surface without tedious operations.

In a schematic embodiment of the method of mounting the lamp, the wiring section comprises an input section and an output section, and connecting the power input line and the power line to the wiring section comprises: connecting the power input line to the input section and connecting the power line to the output section.

In this way, the electrical connection between the lamp body and the fixed surface is realized using the input section and the output section, so that power supply from the fixed surface to the lamp body can be realized.

In a schematic embodiment of the method of mounting the lamp, the power input line is connected to the input section by being inserted into the input section, and the power line is connected to the output section by being inserted into the output section.

In this way, the electrical connection between the power input line and the lamp body can be realized by simply inserting the lines, and the user can complete the wiring operation using a single hand without disassembling the lampshade of the lamp body, thereby the troublesome operation of twisting wires in the conventional mounting of the lamp can be avoided.

In a schematic embodiment of the method of mounting the lamp, the mounting section comprises a mounting bracket and a mounting body, and fixing the mounting section of the lamp mounting structure to the fixed surface comprises fixing the mounting bracket to the fixed surface.

In this way, the mechanical connection of the lamp mounting structure to the fixed surface can be realized by the mounting bracket.

In a schematic embodiment of the method of mounting the lamp, the mounting bracket is provided with screw holes, and fixing the mounting bracket to the fixed surface comprises: fixing the mounting bracket to the fixed surface by fastening thumb screws to the fixed surface via the screw holes.

In this way, the mechanical connection of the lamp mounting structure to the fixed surface is realized by means of thumb screws. As the thumb screws are used, the user can fasten the thumb screws one by one through the screw holes with a single hand, without using a tool. Moreover, as only the lamp mounting structure, rather than the entire lamp with a heavy weight, is fixed to the fixed surface, the user can easily complete the fixing operation.

In the embodiments of the application, a technical solution of a lamp mounting structure and a corresponding lamp is provided to at least solve the problem in the prior art that the tool-free, fast and simple mounting of the ceiling lamp cannot be achieved, especially the problem that the wires of the lamp cannot be electrically connected with the power input line with simplicity and convenience, thus achieving the technical effect that enabling the user to easily connect a ceiling lamp mechanically and electrically without any help. The lamp mounting structure includes: a mounting section, fixable to a fixed surface on which a power input line is provided; an engagement section, configured to be detachably connected with a lamp body of a lamp; and a wiring section, configured to realize electrical connection between the power input line and the lamp.

BRIEF DESCRIPTION OF THE DRAWINGS

The accompanying drawings described here are used for providing further understanding of the application, and constitute a part of the application. Schematic embodiments of the application and description thereof are used for illustrating the application and not intended to form an improper limit to the application. In the accompanying drawings.

REFERENCE NUMBERS IN THE DRAWINGS

Figure 1A:
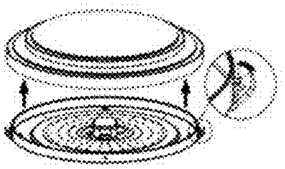
FIG. 1*a* to FIG. 1*f* show a schematic diagram of a ceiling lamp mounting process in the prior art.
Figure 1B:
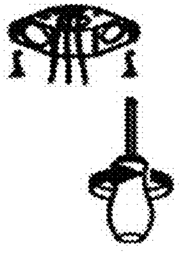
Figure 1C:
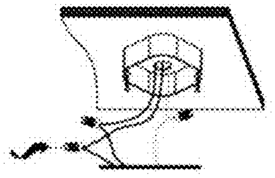
Figure 1D:
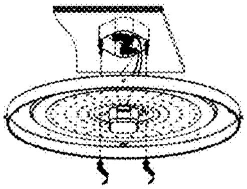
Figure 1E:
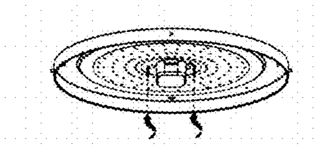
Figure 1F:
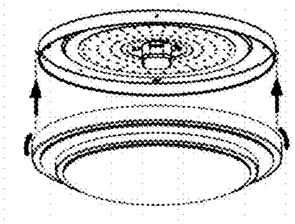

100*a*, 100*b*: lamp mounting structure
101*a*, 101*b*: mounting section
1011: mounting bracket
1013*a*, 1013*b*: mounting body
103*a*, 103*b*: engagement section of lamp mounting structure
105: wiring section
107: junction box
200: lamp body
201: engagement section of lamp body
300: lamp

DETAILED DESCRIPTION OF THE EMBODIMENTS

In order to make those skilled in the art understand the solutions of the application better, the technical solutions in the embodiments of the application are clearly and completely elaborated below in combination with the accompanying drawings. It is apparent that the described embodiments are only a part of the embodiments of the application but not all. On the basis of the embodiment of the application, all other embodiments obtained on the premise of no creative work of those skilled in the art should fall within the protection scope of the application.

It should be noted that the specification and claims of the application and terms "first", "second", etc. in the foregoing drawings are used for distinguishing similar objects rather than describing a specific sequence or a precedence order. It should be understood that the objects may be exchanged under appropriate circumstances, so that the embodiments of the application described here may be implemented in an order different from that described or shown here. In addition, terms "include" and "have" and any variations thereof are intended to cover non-exclusive inclusions. For example, it is not limited for processes, methods, systems, products or devices containing a series of steps or modules or units to clearly list those steps or modules or units, and other steps or modules or units which are not clearly listed or are inherent to these processes, methods, products or devices may be included instead.

Figure 2A:
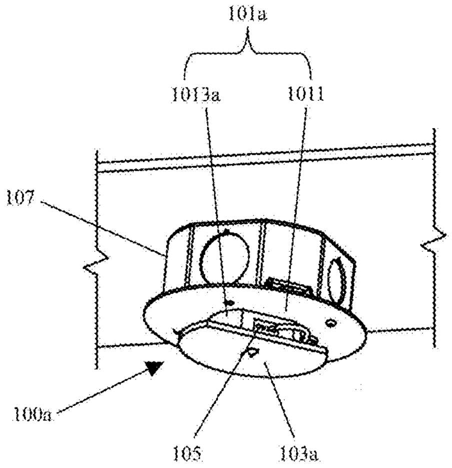
FIG. 2*a* shows a structure diagram of a lamp mounting structure according to an exemplary embodiment of the application.

According to an embodiment of the application, a lamp mounting structure is provided. FIG. 2*a* shows a structure diagram of a lamp mounting structure according to an exemplary embodiment of the application. As shown in FIG. 2*a*, the lamp mounting structure 100*a* includes: a mounting section 101*a*, fixable to a fixed surface on which a power input line is provided (e.g. a mains supply input line); an engagement section 103*a*, configured to be detachably connected with a lamp body of a lamp; and a wiring section 105, configured to realize electrical connection between the power input line and the lamp.

In this way, by realizing the electrical connection between the power input line and the lamp using the wiring section 105, realizing the mechanical connection between the lamp mounting structure 100*a* and the lamp body using the engagement section 103*a*, and realizing the mechanical connection between the lamp mounting structure 100*a* and the fixed surface using the mounting section 101*a*, the mechanical connection between the lamp body and the fixed surface and the electrical connection between the lamp body and the mains supply can be realized. In addition, using the lamp mounting structure 100*a* enables the user to easily mount the lamp body onto the desired fixed surface without tedious operation, thereby simplifying the mounting operation of the user.

In the embodiment, the fixed surface is the lower surface of the junction box 107 on the ceiling.

In the embodiment, the wiring section 105 is a connecting terminal. The connecting terminal includes input sockets and output sockets, which are used as an input section and an output section respectively. The electrical connection is formed by inserting the power input line into the input sockets and inserting the power line of the lamp into the output sockets.

In the embodiment, the wiring section 105 is built in the mounting section 101*a*, so that the input sockets and the output sockets of the wiring section 105 are on the side surface of the mounting section 101*a*.

In this way, by exposing the input socket and the output socket from the side surface of the mounting section 101*a*, the power input line and the power line of the lamp body may be conveniently inserted into the input sockets and the output sockets respectively to form the electrical connection.

It is to be noted that the wiring section 105 is not limited to being built in the mounting section 101*a*, but can also be attached to the mounting section 101*a* from the outside of the mounting section 101*a*, as long as its position is suitable for inserting the power input line and the power line therein.

In the embodiment, the mounting section 101*a* has a closed outer surface. However, the structure of the mounting section 101*a* is not limited to this. For example, the mounting section 101*a* may also have a hollow structure which divides the side surface of the mounting section 101*a* into an inner surface and an outer surface. In this case, the input sockets and the output sockets may be both on the inner surface of the mounting section 101*a*, both on the outer surface of the mounting section 101*a*, or respectively on the outer surface and inner surface of the mounting section 101*a* (i.e. the input sockets and the output sockets opposite each other), so as to be suitable for inserting the power input line and the power line therein respectively.

Preferably, in the embodiment, the connecting terminal is a crystal terminal. With the crystal terminal, the power input line and the power line of the lamp body may be easily inserted into the sockets.

It is to be noted that the connecting terminal in the application is not limited to the crystal terminal, but may be any terminal used for inserting the wires therein to form the electrical connection.

In the embodiment, the connecting terminal includes a couple of input sockets and a couple of output sockets. Preferably, the connecting terminal includes three input sockets and three output sockets. The three input sockets may be respectively used for inserting the fire wire, zero wire and ground wire of the power input line therein, and the three output sockets may be respectively used for inserting the fire wire, zero wire and ground wire of the power line of the lamp body therein, so as to form the electrical connection respectively between the fire wire, zero wire and ground wire of the power input line and those of the power line.

In the embodiment, the mounting section 101*a* includes: a mounting bracket 1011, configured to fix the lamp mounting structure 100*a* to the fixed surface; and a mounting body 1013*a*, which is below and connected to the mounting bracket 1011. The engagement section 103*a* is arranged below the mounting body 1013*a*.

In the embodiment, the mounting body 1013*a* is fixed to or detachably connected with the mounting bracket 1011. The engagement section 103*a* is fixed to or detachably connected with the mounting body 1013*a*.

In this way, the mounting bracket 1011 and the mounting body 1013*a* may be set to be detachable or non-detachable, and the engagement section 103*a* and the mounting body 1013*a* may be set to be detachable or non-detachable, so that a variety of parts of the lamp mounting structure may be flexibly set to be suitable for a variety of use scenarios.

In the embodiment, the mounting bracket 1011 is provided with screw holes. Thus, the mounting bracket 1011 can be fixed to the fixed surface by means of thumb screws.

In this way, the mounting bracket 1011 may be fixed to the fixed surface only through the user's manual operation without the need for additional tools. Thus, the user's mounting operation is improved.

Preferably, in the embodiment, in the horizontal plane, the cross-sectional area of the mounting bracket 1011 is larger than that of the mounting body 1013*a*. In this way, the mounting bracket 1011 can be easily fixed to the fixed surface.

Preferably, in the embodiment, in the horizontal plane, the cross-sectional area of the mounting body 1013*a* decreases first and then increases from top to bottom. For example, in the vertical plane, the side surface of the mounting body 1013*a* may have a parabolic shape. In this way, it is easy for the user to operate while holding the mounting body 1013*a* with a single hand. However, the cross-sectional area of the mounting body 1013*a* is not limited to this. For example, in FIG. 2*a*, the cross-sectional area of the mounting body 1013*a* in the horizontal plane is the same from top to bottom.

Preferably, in the embodiment, in the horizontal plane, the cross-sectional area of the mounting body 1013*a* is smaller than that of the engagement section 103*a*. In this way, a large area of the engagement section is set, makes it easy for the user to hold the lamp body and engage the engagement section 103*a* with the corresponding engagement section on the lamp body.

For example, as shown in FIG. 2*a*, in the lamp mounting structure 100*a*, in the horizontal plane, the mounting bracket 1011 has the largest cross-sectional area, the mounting body 1013*a* has the smallest cross-sectional area, and the cross-sectional area of the engagement section 103*a* is between the area of the mounting bracket 1011 and the area of the mounting body 1013*a*. In this way, the user can easily perform the mounting operation while holding the lamp mounting structure 100*a* or the lamp body.

Figure 3:
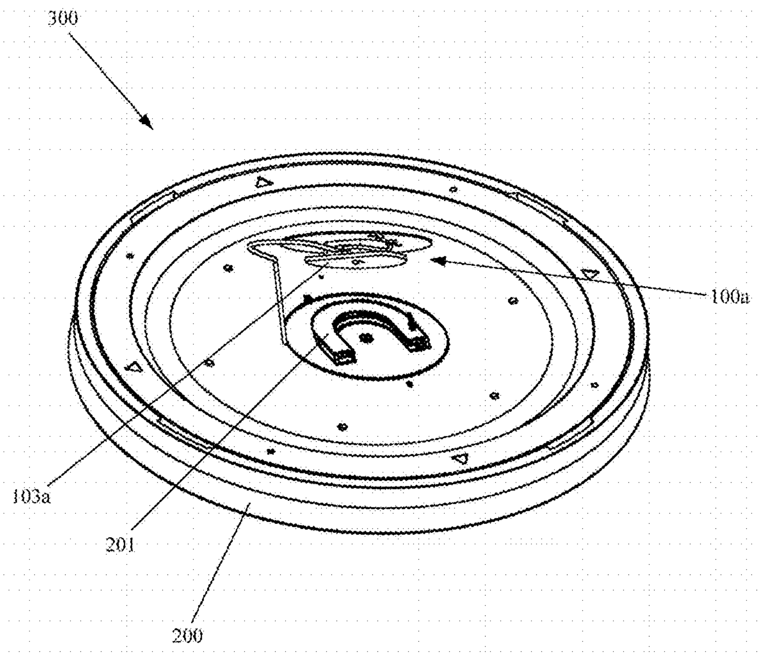
FIG. 3 shows a structure diagram of a lamp according to an exemplary embodiment of the application.

As shown in FIG. 2*a*, the engagement section 103*a* includes a convex portion. The convex portion is in the shape of a flat disk. Especially, the edge of the convex portion is U-shaped. In this case, by forming a U-shaped engaging groove (as shown in FIG. 3) on the lamp body matching with the shape of the U-shaped convex portion, and sliding the U-shaped convex portion into the U-shaped engaging groove by moving the lamp body, the engagement of the lamp body and the engagement section 103*a* can be realized. When the lamp body has been engaged with the engagement section 103*a*, the peripheral part of the engagement section 103*a* is in the U-shaped engaging groove.

By appropriately setting the thickness of the mounting body 1013*a*, there will be only a very small gap between the lamp body and the mounting bracket 1011 after engaging the lamp body with the engagement section 103*a*, so a beautiful ceiling effect can be achieved when the lamp is a ceiling lamp.

It is to be noted that the convex portion is not limited to being U-shaped, but may also be formed to be arc-shaped (e.g. semicircular or circular), rod-shaped, and so on. When the convex portion is arc-shaped, the engagement of the lamp body and the engagement section 103*a* is realized by arranging an arc-shaped engaging groove on the lamp body matching with the shape of the arc-shaped convex portion and screwing the convex portion into the engaging groove of the lamp body. When the convex portion is rod-shaped, the engagement of the lamp body and the engagement section 103*a* is realized by arranging a rod-shaped engaging groove on the lamp body matching with the shape of the rod-shaped convex portion and pressing or embedding the rod-shaped convex portion into the rod-shaped engaging groove of the lamp body.

It is to be noted that in the embodiments of the application, the engagement section is not limited to being arranged under the mounting body, but may also be arranged on the mounting body or formed by a part of the mounting body.

Figure 2B:
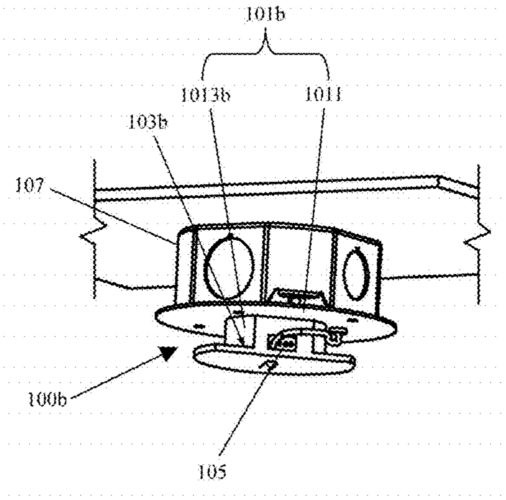
FIG. 2*b* shows a structure diagram of a lamp mounting structure according to another exemplary embodiment of the application.

FIG. 2*b* shows a structure diagram of a lamp mounting structure according to another exemplary embodiment of the application. The lamp mounting structure 100*b* shown in FIG. 2*b* is similar to the lamp mounting structure 100*a* shown in FIG. 2*a*, with the only difference lie in that the engagement section 103*b* of the lamp mounting structure 100*b* in FIG. 2*b* is formed by a part of the mounting section 101*b*. Specifically, the mounting section 101*b* includes the mounting bracket 1011 and the mounting body 1013*b*, and the mounting body 1013*b* is formed integrally and includes a U-shaped part provided with the wiring section 105 and a flat disk-shaped part. The engagement section 103*b* has a structure of an engaging groove defined by the side surface of the mounting body 1013*b* and a part of the lower surface connected with the side surface, as indicated by the arrow of 103*b* in FIG. 2*b*.

In the embodiment, as the part defined by the side surface of the mounting body 1013*b* is U-shaped, the engagement section 103*b* is a U-shaped engaging groove. However, it is conceivable that the engagement section 103*b* may also be formed to be arc-shaped, for example, semicircular or circular.

In this case, by arranging a U-shaped convex portion on the lamp body matching with the shape of the U-shaped engaging groove, and sliding the U-shaped convex portion into the U-shaped engaging groove, the engagement of the lamp body and the engagement section 103*b* can be realized. When the lamp body is engaged with the engagement section 103*b*, the U-shaped convex portion of the lamp body is tightly attached to the U-shaped side surface of the mounting body 1013*b* and a part of the lower surface connected with the U-shaped side surface.

In this case, the height of the convex portion on the lamp body is smaller than or equal to the thickness of the U-shaped side surface of the mounting body 1013*b*. In the case that the height of the convex portion is equal to the thickness of the side surface of the mounting body 1013*b*, when the lamp body is engaged with the engagement section 103*b*, the lamp body is connected with the lamp mounting structure 100*b* without gap, thus achieving the beautiful ceiling effect of the lamp.

Similarly, when the engagement section 103*b* is formed as the arc-shaped engaging groove, the engagement of the lamp body and the engagement section 103*b* is realized by arranging an arc-shaped convex portion on the lamp body matching with the shape of the arc-shaped engaging groove and screwing the convex portion into the arc-shaped engaging groove.

In addition, it is also conceivable that the engagement section 103*b* is not formed by the side surface and the lower surface of the mounting body 1013*b*, but only by the lower surface of the mounting body 1013*b*. In this case, the mounting body 1013*b* may not have the disk-shaped part shown in FIG. 2*b*, but only has the U-shaped part (alternatively, the arc-shaped part) shown in FIG. 2*b*. In this case, the engagement section 103*b* may be the engaging groove formed by the lower surface of the mounting body 1013*b* concaving inward. The engaging groove may be U-shaped, arc-shaped, rod-shaped, etc. By arranging the convex portion on the lamp body matching with the shape of the engaging groove, the engagement of the lamp body and the engagement section 103*b* may be realized.

In addition, it is also conceivable that the engagement section 103*b* is not formed by the side surface and the lower surface of the mounting body 1013*b*, but only by the side surface of the mounting body 1013*b*. In this case, the mounting body 1013*b* does not have the disk-shaped part, but only a circular part (corresponding to the U-shaped part in FIG. 2*b*). That is, the mounting body 1013*b* is a cylinder. The engagement section 103*b* may be formed by the threads on the side surface of the mounting body 1013*b*. In this case, by arranging threads on the lamp body matching with the shape of the threads on the mounting body 1013*b*, the lamp body may be rotationally fastened onto the mounting body 1013*b*. In this case, the no-gap connection of the lamp body and the lamp mounting structure 100*b* can also be realized.

FIG. 3 shows a structure diagram of a lamp according to an exemplary embodiment of the application. As shown in FIG. 3, the lamp 300 includes the lamp mounting structure 100*a* and the lamp body 200 shown in FIG. 2*a*. The upper surface of the lamp body 200 is provided with the engagement section 201 matching with the engagement section 103*a* of the lamp mounting structure 100*a*.

As shown in FIG. 3, the upper surface (the mounting surface) of the lamp body 200 is provided with the engagement section 201 matching with the shape of the engagement section 103*a* (the U-shaped convex portion). The engagement section 201 is the U-shaped engaging groove. By sliding the engagement section 103*a* into the engagement section 201, the engagement of the lamp body 200 and the lamp mounting structure 100*a* can be realized.

Similarly, when the engagement section 103*a* of the lamp mounting structure 100*a* includes the convex portion in other shape, the engagement section 201 of the lamp body 200 may be set as an engaging groove that matches with shape of the convex portion. When the engagement section 103*a* of the lamp mounting structure 100*a* includes the engaging groove in any shape among all the above shapes, the engagement section 201 of the lamp body 200 may be set as a convex portion that matches with the shape of the engaging groove. In addition, when the engagement section 103*a* of the lamp mounting structure 100*a* includes the threads on its side surface, the engagement section 201 of the lamp body 200 may be set as threads matching with the threads of the lamp mounting structure 100*a*. That is, the mechanical connection between the lamp mounting structure 100*a* and the lamp body 200 may be achieved in many ways without the use of any mounting tool.

In the embodiment, the power line of the lamp body 200 is exposed from the upper surface and can be inserted into the wiring section 105 of the lamp mounting structure 100*a*. Thus, the electrical connection between the power input line and the lamp 300 can be realized.

In this way, the electrical connection between the power input line and the lamp can be realized by means of the wiring section 105, and the mechanical connection between the lamp mounting structure 100*a* and the lamp body 200 can be realized by means of the engagement section 103*a*. That is, by means of the lamp 300, the user may easily mount the lamp 300 onto the desired fixed surface without tedious operation, thus improving the mounting operation of the user.

FIG. 4*a* to FIG. 4*d* show schematic diagrams of a lamp mounting process according to an exemplary embodiment of the application. Specifically, taking the lamp 300 in FIG. 3 as an example, FIG. 4*a* to FIG. 4*d* show the process of mounting the lamp 300 onto the fixed surface (i.e. the lower surface of the junction box 107 on the ceiling). In this case, the lamp 300 includes the lamp mounting structure 100*a* shown in FIG. 2*a*.

Figure 4A:
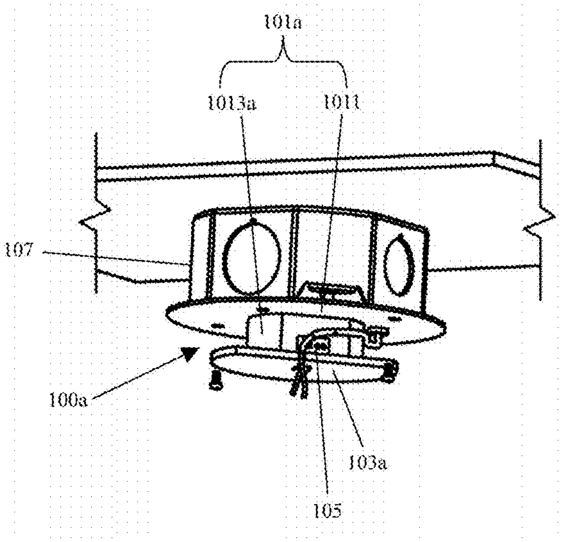
FIG. 4*a* to FIG. 4*d* show schematic diagrams of a lamp mounting process according to an exemplary embodiment of the application.

As shown in FIG. 4*a*, the mounting bracket 1011 is fixed to the lower surface of the junction box 107 by means of thumb screws. In this case, the user may hold the mounting body 1013*a* with one hand and fasten the thumb screws one by one through the screw holes of the mounting bracket 1011 with the other hand.

This process does not require the use of additional tools for fastening, and the user has no need to hold a heavy lamp as mounting a traditional lamp. Thus, it is convenient for the user to perform mount operation.

Figure 4B:
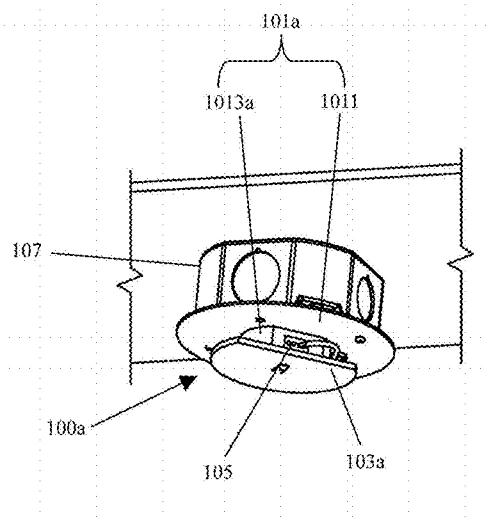

Next, as shown in FIG. 4*b*, the power input line on the junction box 107 is inserted into the wiring section 105.

In the embodiment, the mounting bracket 1011 may be provided with an additional through hole for the power input line to pass through. The wiring section 105 may be a connecting terminal, preferably a crystal terminal.

For example, the user may insert the fire wire, zero wire and ground wire of the power input line into three input sockets of the wiring section 105 one by one.

During this process, the user only needs to simply insert the wires therein with one hand, without the need for complex and tedious wire twisting operation.

Figure 4C:
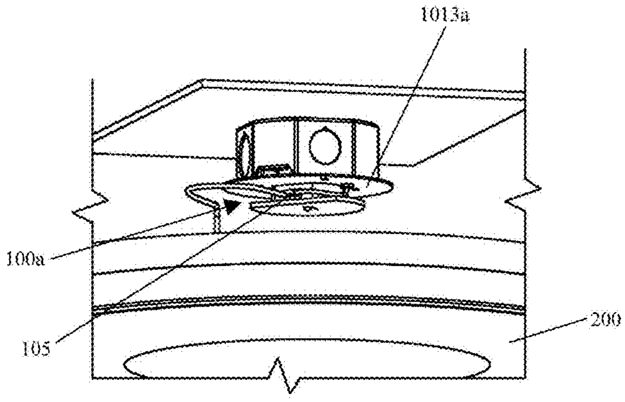

Next, as shown in FIG. 4*c*, the power line of the lamp body 200 is inserted into the wiring section 105.

For example, the user may hold the lampshade (the lower surface of the lamp body 200, as shown in FIG. 4*c*) with one hand and insert the fire wire, zero wire and ground wire of the power line into the three output sockets of the wiring section 105 one by one with the other hand.

Similarly, during this process, the user only needs to simply insert the wires therein, without the need for complex and tedious wire twisting operation, so the lamp mounting operation is simplified.

Figure 4D:
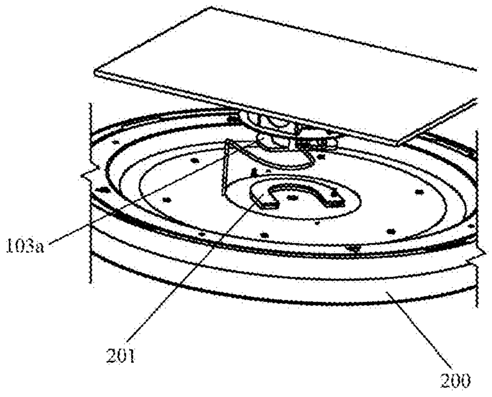

Next, as shown in FIG. 4*d*, the engagement section 103*a* of the lamp mounting structure 100*a* is engaged with the engagement section 201 of the lamp body 200.

For example, the user may hold and move the lamp body 200 with two hands to slide the U-shaped engagement section 103*a* on the lamp mounting structure 100*a* into the U-shaped engagement section 201 of the lamp body 200, so as to realize the mechanical connection between the lamp mounting structure 100*a* and the lamp body 200.

After engagement, the mounting of the lamp 300 is completed.

Through the above steps, the user may easily and quickly mount the lamp 300 onto the junction box 107 on the ceiling. Moreover, the user does not need to use a screwdriver or other additional tools for fastening, and does not need tedious wire twisting operation, and will not feel laborious due to operation with holding the lamp for a long time.

In addition, in the above mounting process, there is no need to disassemble and reassemble the mounting surface or the lampshade of the lamp body 200, which not only makes the mounting process simpler, but also avoids the risk of aging or failure of the parts within the lamp body caused by the user disassembling the lamp body to operate. Therefore, by means of the lamp 300, the user may easily implement a tool-free, fast and simple lamp mounting process.

It is conceivable that when the lamp 300 includes the lamp mounting structure 100*b* as shown in FIG. 2*b* or the lamp mounting structure with other engagement section as described in the specification, rather than the lamp mounting structure 100*a*, the mounting method is similar to the method described with reference to FIG. 4*a* to FIG. 4*d*. Therefore, it will not be repeated here.

In the above embodiments of the application, the descriptions of the embodiments focus on different aspects. A part which is not described in a certain embodiment in detail may refer to the related description of the other embodiments.

In the several embodiments provided in the application, it should be understood that the technical contents disclosed may be realized in other ways. The embodiment of the device described above is only schematic; for example, the division of the units or modules is only a division of logical functions, and there may be other dividing modes during the actual implementation, for example, multiple units or modules or components may be combined or integrated to another system, or some features may be ignored or are not executed.

The above is only the preferred embodiments of the application; it should be indicated that, on the premise of not departing from the principles of the application, those of ordinary skill in the art may also make a number of improvements and supplements, and these improvements and supplements should fall within the protection scope of the application.

What we claimed is:

1. A lamp mounting structure, comprising:

a mounting section, fixable to a fixed surface on which a power input line is provided and comprising a mounting bracket configured to fix the lamp mounting structure to a fixed surface, and a mounting body connected to the mounting bracket;

an engagement section includes a convex portion in the shape of a flat disk covering an entire bottom surface of the mounting body configured to be detachably connected with a lamp body of a lamp; and a wiring section, configured to realize electrical connection between the power input line and the lamp, wherein in a horizontal plane, the mounting bracket includes a cross-sectional area larger than that of the engagement section and the engagement section includes a cross-sectional area larger than that of the mounting body.

2. The lamp mounting structure according to claim 1, wherein the wiring section is built in or attached to the mounting section.

3. The lamp mounting structure according to claim 1, wherein the wiring section includes an input section and an output section, and the electrical connection is formed by connecting the power input line to the input section and connecting a power line of the lamp to the output section.

4. The lamp mounting structure according to claim 3, wherein the input section and the output section are positioned on a side surface of the mounting section.

5. The lamp mounting structure according to claim 4, wherein the mounting section has a hollow structure, and the side surface comprises an inner surface and an outer surface; and the input section is on the inner surface or the outer surface; and the output section is on the inner surface or the outer surface.

6. The lamp mounting structure according to claim 3, wherein the wiring section comprises a connecting terminal comprising a couple of input sections and a couple of output sections.

7. The lamp mounting structure according to claim 1, wherein the engagement section is arranged below the mounting body.

8. The lamp mounting structure according to claim 7, wherein the lamp body is fixed to the lamp mounting structure by engaging with the convex portion.

9. The lamp mounting structure according to claim 8, wherein the convex portion is U-shaped, arc-shaped or rod-shaped.

10. The lamp mounting structure according to claim 7, wherein the mounting bracket is provided with screw holes, and the mounting bracket is fixed to the fixed surface by means of thumb screws.

11. The lamp mounting structure according to claim 1, wherein the engagement section is arranged on the mounting body.

12. The lamp mounting structure according to claim 11, wherein the engagement section comprises threads arranged on the side surface of the mounting body or an engaging groove arranged on the side surface or a lower surface of the mounting body; the lamp body is fixed to the lamp mounting structure by being rotated with the threads or engaging with the engaging groove.

13. The lamp mounting structure according to claim 12, wherein the engaging groove is U-shaped, arc-shaped or rod-shaped.

14. The lamp mounting structure according to claim 1, wherein the fixed surface is the lower surface of a wall, a ceiling, or a junction box on the ceiling.

15. A lamp, comprising:

a lamp mounting structure according to claim 1; and a lamp body, an upper surface of which is provided with a lamp body engagement section matching with the engagement section of the lamp mounting structure.

16. The lamp according to claim 15, wherein a power line of the lamp body is exposed from the upper surface, and the power line is electrically connected with the power input line by being inserted into the wiring section of the lamp mounting structure.

17. The lamp according to claim 15, wherein, when the engagement section of the lamp mounting structure comprises a convex portion, the lamp body engagement section comprises an engaging groove matching with the shape of the convex portion to engage with the convex portion; or when the engagement section of the lamp mounting structure comprises an engaging groove, the lamp body engagement section comprises a convex portion matching with the shape of the engaging groove to engage with the engaging groove.

18. The lamp according to claim 15, wherein when the engagement section of the lamp mounting structure comprises threads arranged on the side surface of the lamp mounting structure, the lamp body engagement comprises threads matching with the threads of the lamp mounting structure, and the threads of the lamp body engagement section are on a side surface concaved downward from the upper surface of the lamp body.

19. A method of mounting a lamp, wherein the lamp comprises a lamp mounting structure and a lamp body, the lamp body is provided with a power line, the method comprising:

fixing the lamp mounting structure to a fixed surface, the fixed surface being provided with a power input line;

connecting the power input line and the power line to the lamp mounting structure; and engaging the lamp mounting structure via an engagement section including a convex portion in the shape of a flat disk covering an entire bottom outer surface of a mounting body of the lamp mounting structure with the lamp body, wherein in a horizontal plane, the mounting bracket includes a cross-sectional area larger than that of the engagement section and the engagement section includes a cross-sectional area larger than that of the mounting body.

20. The method of mounting the lamp according to claim 19, wherein the lamp mounting structure comprises a mounting section, the engagement section and a wiring section, the lamp body comprises an engagement section, wherein fixing the lamp mounting structure to the fixed surface comprises fixing the mounting section of the lamp mounting structure to the fixed surface, connecting the power input line and the power line to the lamp mounting structure comprises connecting the power input line and the power line to the wiring section of the lamp mounting structure, and engaging the lamp mounting structure with the lamp body comprises engaging the engagement section of the lamp mounting structure with the lamp body engagement section.

21. The method of mounting the lamp according to claim 20, wherein the wiring section comprises an input section and an output section, and connecting the power input line and the power line to the wiring section comprises:

connecting the power input line to the input section and connecting the power line to the output section.

22. The method of mounting the lamp according to claim 21, wherein the power input line is connected to the input section by being inserted into the input section, and the power line is connected to the output section by being inserted into the output section.

23. The method of mounting the lamp according to claim 20, wherein the mounting section comprises a mounting bracket and the mounting body, and fixing the mounting section of the lamp mounting structure to the fixed surface comprises fixing the mounting bracket to the fixed surface.

24. The method of mounting the lamp according to claim 23, wherein the mounting bracket is provided with screw holes, and fixing the mounting bracket to the fixed surface comprises fixing the mounting bracket to the fixed surface by fastening thumb screws to the fixed surface via the screw holes.

* * * * *